United States Patent
Tsumori et al.

(10) Patent No.: US 6,435,880 B1
(45) Date of Patent: Aug. 20, 2002

(54) LEARNING-SUPPORT DEVICE AND LEARNING-SUPPORT METHOD

(75) Inventors: Shinichi Tsumori, Kasuya-gun; Makoto Matsuoka, Izuka; Yuichi Kawaguchi, Kasuya-gun, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 55 days.

(21) Appl. No.: 09/642,695

(22) Filed: Aug. 22, 2000

(30) Foreign Application Priority Data

Aug. 23, 1999 (JP) .......................... 11-235041

(51) Int. Cl.[7] ................................ G09B 7/00
(52) U.S. Cl. .................. 434/323; 434/307 R; 434/362
(58) Field of Search ................. 434/247, 231, 434/373, 322, 335, 118, 362, 323, 307 R; 273/237, 437, 429, 430

(56) References Cited

U.S. PATENT DOCUMENTS

| | | | |
|---|---|---|---|
| 4,854,878 A | * 8/1989 | Malvino et al. | 434/335 |
| 5,456,607 A | * 10/1995 | Antoniak | 434/323 |
| 5,885,087 A | * 3/1999 | Thomas | 434/373 |
| 5,927,988 A | * 7/1999 | Jenkins et al. | 434/116 |
| 6,155,838 A | * 12/2000 | Hyma et al. | 434/322 |
| 6,175,841 B1 | * 1/2001 | Loiacono | 707/512 |
| 6,267,379 B1 | * 7/2001 | Forrest et al. | 273/431 |
| 6,296,487 B1 | * 10/2001 | Lotecka | 434/118 |

FOREIGN PATENT DOCUMENTS

JP     11-95646     4/1999

* cited by examiner

Primary Examiner—Joe H. Cheng
Assistant Examiner—Kathleen M. Christman
(74) Attorney, Agent, or Firm—Wenderoth, Lind & Ponack, L.L.P.

(57) ABSTRACT

A learning-support device offers a sufficient learning effect even in a field of learning that sets its goal on mastering a motion itself. A question-screen display part displays a question-screen composed of a question and moving images as choices for an answer. A selection reception part receives a user-selection indicating which of the moving images on the question-screen is selected by a user. A correct/incorrect determination part determines whether the user-selection is correct or incorrect. When the user-selection is determined as correct, a correct-answer-explanation-screen display part displays a correct-answer-explanation-screen including an explanation for the correct answer and the correct moving image. When the user-selection is determined as incorrect, an incorrect-answer-explanation-screen display part displays an incorrect-answer-explanation-screen including an explanation for the incorrect answer and the correct moving image.

17 Claims, 13 Drawing Sheets

F I G. 3

| | QUESTION | CORRECT ANSWER | FIRST CHOICE | SECOND CHOICE | THIRD CHOICE | CORRECT-ANSWER-EXPLANATION | INCORRECT-ANSWER-EXPLANATION |
|---|---|---|---|---|---|---|---|
| FIRST QUESTION | QUESTION 1 | MOVING IMAGE 2 | MOVING IMAGE 1 | MOVING IMAGE 2 | MOVING IMAGE 3 | EXPLANATION 1 | EXPLANATION 2 |
| SECOND QUESTION | QUESTION 2 | MOVING IMAGE 4 | MOVING IMAGE 4 | MOVING IMAGE 5 | MOVING IMAGE 6 | EXPLANATION 3 | EXPLANATION 4 |
| THIRD QUESTION | QUESTION 3 | MOVING IMAGE 9 | MOVING IMAGE 7 | MOVING IMAGE 8 | MOVING IMAGE 9 | EXPLANATION 5 | EXPLANATION 6 |
| . . . | | | | | | | |

FIG. 9
[QUESTION] WHICH IS THE CORRECT GOLF SWING ?
CLICK THE CORRECT MOVING IMAGE.
  
(FILE: "MOVING IMAGE 1")    (FILE: "MOVING IMAGE 2")    (FILE: "MOVING IMAGE 3")
FIG. 10
[QUESTION] WHICH IS THE CORRECT GOLF SWING ?
INPUT THE NUMBER OF THE CORRECT MOVING IMAGE.
1      2      3
  
ANSWER [ ]

FIG. 11
[QUESTION] WHICH IS THE CORRECT GOLF SWING ?
PRESS THE BUTTON ABOVE THE CORRECT MOVING IMAGE.
1 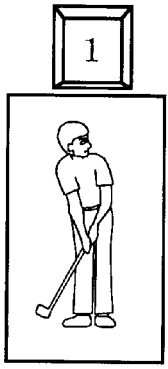 2  3 
FIG. 12
[EXPLANATION] CORRECT.
LET'S SEE CORRECT MOVING
IMAGE ONCE AGAIN.

[EXPLANATION] INCORRECT.
LET'S SEE CORRECT MOVING
IMAGE ONCE AGAIN.

[EXPLANATION] INCORRECT. LET'S COMPARE
CORRECT MOVING IMAGE
(LEFT) WITH MOVING IMAGE
YOU SELECTED (RIGHT).

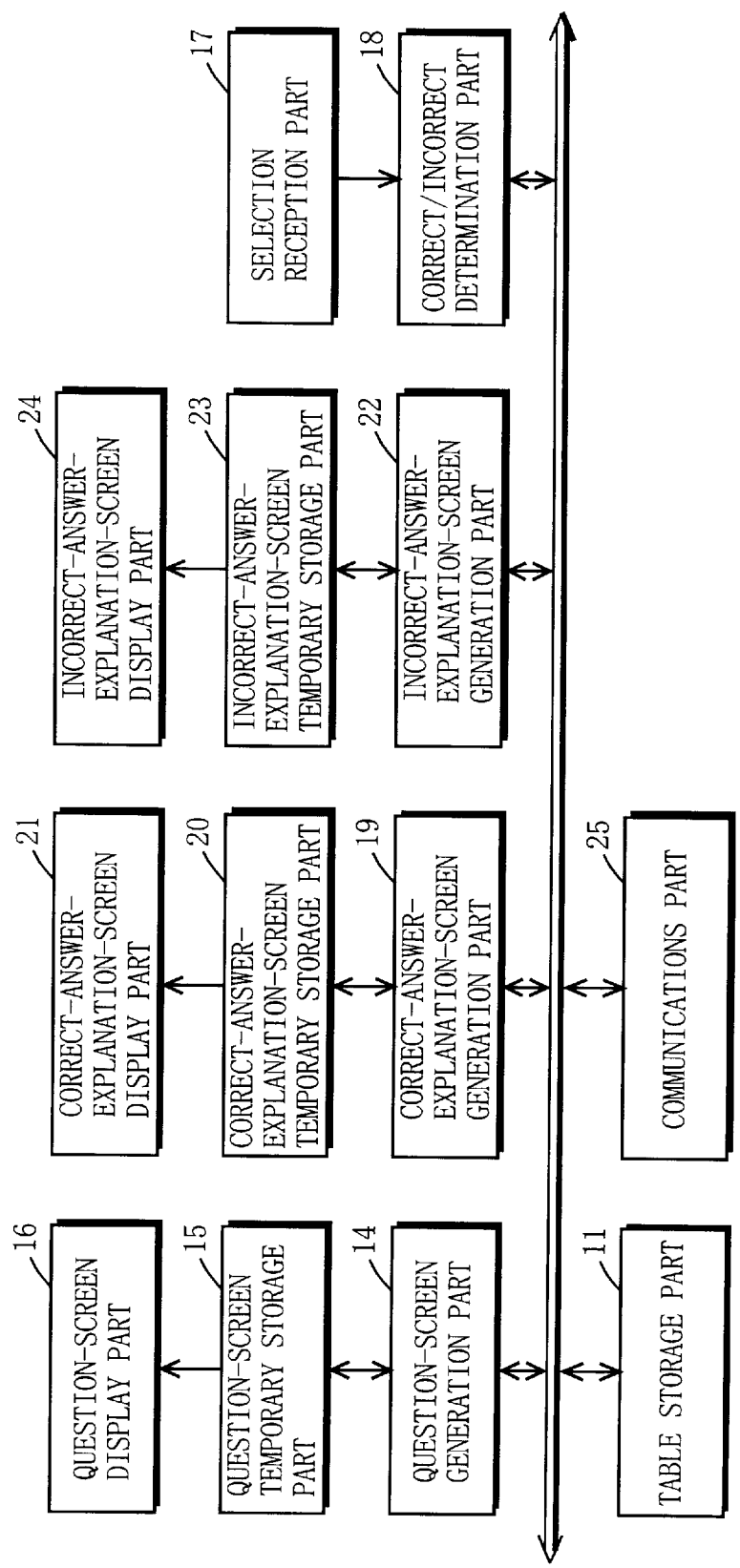
F I G. 16

FIG. 19 PRIOR ART

[QUESTION] WHICH IS THE HIGHEST MOUNTAIN IN JAPAN ?

1. MT. FUJI
2. MT. ASO
3. MT. ADACHI

FIG. 20 PRIOR ART

[EXPLANATION] INCORRECT.

THE CORRECT ANSWER IS "1. MT. FUJI".

LEARNING-SUPPORT DEVICE AND LEARNING-SUPPORT METHOD

BACKGROUND OF THE INVENTION

1. Field of the Invention

The present invention relates to learning-support devices and methods, and more particularly, to a learning-support device and method of a type supporting a user's learning through making answer-selectable questions and explanations corresponding to the user's answers.

2. Description of the Background Art

Computer-aided learning-support provided for self-learning has a long history. Especially, there is a kind of learning-support method that asks a question with a plurality of choices of answers for a user to select one he/she considers as correct (hereinafter, referred to as "answer-selectable question"), and gives an explanation corresponding to the user-selected answer. Since the learning-support method of the above kind is easily realized on computers, many computer programs adopting the method have been in actual use.

In conventional learning-support devices, the choices of answers offered to the user are generally objects or concepts indicated by their names described in character strings as shown in FIG. 19. On the other hand, as shown in FIG. 20, the explanations made in response to the answers selected by the user are presented in phrases or sentences composed of character strings. Such phrases or sentences show whether the answers are correct or incorrect, and also show explanations of the objects or concepts including definitions or meanings thereof.

In some fields of learning, however, a precise expression in language is impossible or extremely difficult, and even if possible, the user may not understand the expression by intuition. For example, in a field of golf swing instruction, a motion of a golf swing is extremely difficult to precisely express in language.

In such field of learning, moving images are more appropriate than language for intuitive understanding of the user and for improved efficiency of learning.

Japanese Patent Laid-Open Publication No. 11-95646 (1999/95646) exemplarily discloses a learning-support method adopting images and speech. A system disclosed in the publication displays an image-screen showing a traffic situation for a user to make a prediction about a change that will subsequently occur in the situation. The system then presents a plurality of sentences each describing possible changes in the situation as choices for the user. The user presses a button of the number indicating the choice that matches with the prediction he/she has made. Thereafter, the system presents an explanation corresponding to the numbered button pressed by the user with a sentence and also with an image and speech.

In the conventional system disclosed in the publication, the image relevant to the choices is presented in addition to the sentences indicating the choices, and further, the explanation is presented not only with the sentence, but also with the image and speech. Accordingly, the efficiency of learning is increased to a certain degree.

Yet, in some fields of learning that set their goals on mastering a motion itself, such as golf swing, a sufficient learning effect cannot be expected by merely presenting an image relevant to choices and an explanation with image and speech.

SUMMARY OF THE INVENTION

Therefore, an object of the present invention is to provide a learning-support device and method capable of offering a sufficient learning effect even in a field of learning that sets its goal on mastering a motion itself.

The present invention has the following features to achieve the object above.

A first aspect of the present invention is directed to a learning-support device supporting user's a learning by presenting, to a user, an answer-selectable question and an explanation corresponding to an answer selected by the user. The device comprises a question-screen presentation part for presenting a question-screen, including a question and moving images as choices for an answer, a selection reception part for receiving a user-selection indicating which of the moving images included in the question-screen presented by the question-screen presentation part is selected by the user, a correct/incorrect determination part for determining whether the user-selection received by the selection reception part is correct or incorrect, a first explanation-screen presentation part for presenting a correct-answer-explanation-screen, including an explanation for a correct answer and a correct moving image, when the correct/incorrect determination part determines that the user-selection is correct; and a second explanation-screen presentation part for presenting an incorrect-answer-explanation-screen including an explanation for an incorrect answer and the correct moving image when the correct/incorrect determination part determines that the user selection is incorrect.

As described above, in the first aspect of the invention (and in a ninth and a seventeenth aspect of the invention described later), the moving images are aligned on the screen as the choices for the user to select one he/she considers as correct. Accordingly, the learning can be effectively performed even in such field that sets its goal on mastering a motion itself. Further, the unerring understanding of the correct motion is possible by, once again, displaying the correct moving image with the explanation in written language. As a result, a sufficient learning effect is expected.

In a case of learning golfs wings, the question-screen presents choices of swing motions. The user, therefore, can select from among the presented choices after carefully examining the minute difference thereamong. Further, the moving image of the correct swing motion is once again presented with the explanation in written language, enabling the effective learning of the correct swing motion.

According to a second aspect of the invention, based on the first aspect of the invention, the device further comprises a first storage part for previously storing a group of questions, a group of moving images, and a group of explanations, and a second storage part for previously storing a table providing information pointing out, for each answer-selectable question, the question, the moving images as being the choices, the correct moving image, and the explanations for correct and incorrect answers to be read out from the group of questions, the group of moving images, and the group of explanations which are stored in the first storage part.

In addition, the question-screen presentation part generates the question-screen by referring to the table stored in the second storage part and reading out the question and the moving images as being the choices of answer from the first storage part. The first explanation-screen presentation part generates the correct-answer-explanation-screen by referring to the table stored in the second storage part and reading out the explanation for the correct answer and the correct moving image from the first storage part. The second explanation-screen presentation part generates the incorrect-answer-explanation-screen by referring to the table stored in the second storage part and reading out the explanation for the incorrect answer and the correct moving image from the first storage part.

As described above, in the second aspect of the invention, the first storage part previously stores the group of questions, the group of moving images, and the group of explanations, and the second storage part previously stores the table. On the table, described are pointing information (i.e., pointers), for each answer-selectable question, the question, the moving images as being the choices, the correct moving image, and the explanations for correct and incorrect answers to be read out from the group of questions, the group of moving images, and the group of explanations. The screen generation part, therefore, generates respective screens by referring to the table and reading out the corresponding questions, explanations, and moving images from the first storage part.

Note that the first and the second storage parts may be implemented by either separate recording mediums or a single recording medium. Such recording mediums are typically CD-ROMs, but may be DVDs, memory cards, floppy disks, or hard disks.

According to a third aspect of the invention, the incorrect-answer-explanation-screen presented by the second explanation-screen presentation part further includes a moving image of the incorrect answer corresponding to the user-selection.

As described above, in the third aspect of the invention (and in a seventh, an eleventh, and a fifteenth aspect of the invention described later), when the selected image is incorrect, such incorrect moving image is aligned and displayed with the correct moving image on the explanation screen, thereby allowing the user to promptly and correctly understand why the moving image he/she selected is incorrect. As a result, more effective learning of the correct motion becomes possible.

In a case of learning golf swings, when the selected swing motion is incorrect, the correct swing motion and the incorrect swing motion are aligned and displayed together on the explanation screen, thereby allowing the user to promptly and correctly understand why the swing motion he/she selected is incorrect. As a result, more effective learning of the correct swing motion becomes possible.

According to a fourth aspect of the invention, based on the third aspect of the invention, the second explanation-screen presentation part generates the incorrect-answer-explanation-screen by referring to the table stored in the second storage part and further reading out the moving image of the incorrect answer corresponding to the user-selection from the first storage part.

According to a fifth aspect of the invention, based on the first aspect of the invention, a server previously stores a group of questions, a group of moving images, and a group of explanations. The device further comprises a table storage part for storing a table providing information pointing out, for each answer-selectable question, the question, the moving images as being the choices, the correct moving image, and the explanations for correct and incorrect answers to be obtained from the group of questions, the group of moving images, and the group of explanations which are stored in the server, and a communications part for communicating with the server.

The question-screen presentation part generates the question-screen by referring to the table stored in the table storage part and obtaining the question, and the moving images as being the choices from the server through the communications part. The first explanation-screen presentation part generates the correct-answer-explanation-screen by referring to the table stored in the table storage part and obtaining the explanation for the correct answer and the correct moving image from the server through the communications part. Further, the second explanation-screen presentation part generates the incorrect-answer-explanation-screen by referring to the table stored in the table storage part and obtaining the explanation for the incorrect answer and the correct moving image from the server through the communications part.

As describe above, in the fifth aspect of the invention, the group of questions, the group of moving images, and the group of explanations are previously stored in the server and the communications part is provided for communication with the server. In the table stored in the table storage part, described are the pointing information (i.e., pointers), for each answer-selectable question, the question, the moving images as being the choices, the correct moving image, and the explanations for correct and incorrect answers to be obtained from the group of questions, the group of moving images, and the group of explanations. The screen generation part, therefore, generates respective screens by referring to the table and obtaining the corresponding questions, explanations, and moving images from the server through the communications part.

As described in the fifth aspect of the invention, in a case where the learning-support device communicates with the server to obtain the groups of questions, moving images and explanations, communication costs are required and the response of the device may slow down depending on the access conditions to the server and the communications status therewith. Nevertheless, a wide variety of and most updated answer-selectable questions can be obtained.

On the other hand, as described in the second aspect, in a case where the learning-support device previously stores the groups of questions, moving images and explanations (e.g., in an internally fixed hard disk or on a CD-ROM 107 that can be loaded into the device), no communication cost exist and the stable response of the device is achieved, although the number of presentable questions is limited.

Note that the table stored in the table storage part may be previously stored in the table storage part itself, or may be previously stored in the server as will be described in the following sixth aspect. In the latter case, the table storage part obtains and stores the table from the server through the communications part.

The communications part is typically implemented by a modem and a network, if the server is provided on the network, but may be implemented by a radio channel or a dedicated line for communications.

According to a sixth aspect of the invention, based on the fifth aspect of the invention, the table is previously stored in the server, and the table storage part obtains the table from the server through the communications part for storage.

According to a seventh aspect of the invention, based on the fifth aspect of the invention, the incorrect-answer-explanation-screen presented by the second explanation-screen presentation part further includes a moving image of the incorrect answer corresponding to the user-selection.

According to an eighth aspect of the invention, based on the seventh aspect of the invention, the second explanation-screen presentation part generates the incorrect-answer-explanation-screen by referring to the table stored in the table storage part and further obtaining the moving image of the incorrect answer corresponding to the user-selection from the server through the communications part.

A ninth aspect of the present invention is directed to a learning-support method supporting a user's learning by presenting, to a user, an answer-selectable question and an explanation corresponding to an answer selected by the user. The method comprises presenting a question-screen including a question and moving images as being choices for an answer, receiving a user-selection indicating which of the moving images included in the question-screen presented in the question-screen presenting step is selected by the user, determining whether the user-selection received in the selection receiving step is correct or incorrect, presenting a correct-answer-explanation-screen including an explanation for a correct answer and a correct moving image when the user-selection is determined as correct in the correct/incorrect determining step, and presenting an incorrect-answer-explanation-screen including an explanation for an incorrect answer and the correct moving image when the user-selection is determined as incorrect in the correct/incorrect determining step.

According to a tenth aspect of the invention, based on the ninth aspect of the invention, the method further comprises previously storing a group of questions, a group of moving images, and a group of explanations, and previously storing a table providing information pointing out, for each answer-selectable question, the question, the moving images as being the choices, the correct moving image, and the explanations for correct and incorrect answers to be selected from the group of questions, the group of moving images, and the group of explanations which are stored in the table storing step. Further, in the question-screen presenting step, the question-screen is generated by referring to the table stored in the table storing step and selecting the question and the moving images as being the choices for the answer from the group of questions and the group of moving images stored in the group storing step. In the correct-answer-explanation-screen presenting step, the correct-answer-explanation-screen is generated by referring to the table stored in the table storing step and selecting the explanation for the correct answer and the correct moving image from the group of moving images and the group of explanations stored in the group storing step. In the incorrect-answer-explanation-screen presenting step, the incorrect-answer-explanation-screen is generated by referring to the table stored in the table storing step and selecting the explanation for the incorrect answer and the correct moving image from the group of moving images and the group of explanations stored in the group storing step.

As described above, in the tenth aspect of the invention, the group of questions, the group of moving images, and the group of explanations are previously stored in the group storing step, and the table is stored in the table storing step. In the table, described are pointing information (i.e., pointers), for each answer-selectable question, the question, the moving images as being the choices, the correct moving image, and the explanations for correct and incorrect answers selected from the group of questions, the group of moving images, and the group of explanations. In each of the screen presenting steps, a screen is generated by referring to the table and selecting the corresponding questions, explanations, and moving images from the groups of questions, moving images, and explanations stored in the group storing step.

According to an eleventh aspect of the invention, based on the ninth aspect of the invention, the incorrect-answer-explanation-screen presented in the incorrect-answer-explanation-screen presenting step further includes a moving image of the incorrect answer corresponding to the user-selection.

According to a twelfth aspect of the invention, based on the eleventh aspect of the invention, in the incorrect-answer-explanation-screen presenting step, the incorrect-answer-explanation-screen is generated by referring to the table stored in the table storing step and further selecting the moving image of the incorrect answer corresponding to the user-selection from the group of moving images stored in the group storing step.

According to a thirteenth aspect of the invention, based on the ninth aspect of the invention, a server previously stores a group of questions, a group of moving images, and a group of explanations. The method further comprises storing a table providing information pointing out, for each answer-selectable question, the question, the moving images as being the choices, the correct moving image, and the explanations for correct and incorrect answers to be obtained from the group of questions, the group of moving images, and the group of explanations which are stored in the server.

In the question-screen presenting step, the question-screen is generated by referring to the table stored in the table storing step and obtaining the question and the moving images as being the choices from the server through communication therewith. In the correct-answer-explanation-screen presenting step, the correct-answer-explanation-screen is generated by referring to the table stored in the table storing step and obtaining the explanation for the correct answer and the correct moving image from the server through communication therewith. In the incorrect-answer-explanation-screen presenting step, the incorrect-answer-explanation-screen is generated by referring to the table stored in the table storing step and obtaining the explanation for the incorrect answer and the correct moving image from the server through communication therewith.

As described above, in the thirteenth aspect of the invention, the group of questions, the group of moving images, and the group of explanations are previously stored in the server. In the table stored in the table storing step, described are pointing information (i.e., pointers), for each answer-selectable question, the question, the moving images as being the choices, the correct moving image, and the explanations for correct and incorrect answers to be obtained from the group of questions, the group of moving images, and the group of explanations. In each of the screen presenting steps, a screen is generated by referring to the table and obtaining the corresponding question, explanations, and moving images from the server through communication therewith.

Note that the table stored in the table storing step may be previously stored in the server as will be described in the following fourteenth aspect of the invention. In this case, in the table storing step, the table is obtained from the server through communication and stored.

According to a fourteenth aspect of the invention, based on the thirteenth aspect of the invention, the table is previously stored in the server, and in the table storing step, the table is obtained from the server through communications for storage.

According to a fifteenth aspect of the invention, based on the thirteenth aspect of the invention, the incorrect-answer-explanation-screen presented in the incorrect-answer-explanation-screen presenting step further includes a moving image of the incorrect answer corresponding to the user-selection.

According to a sixteenth aspect of the invention, based on the fifteenth aspect of the invention, in the incorrect-answer-explanation-screen presenting step, the incorrect-answer-explanation-screen is generated by referring to the table stored in the table storing step and further obtaining the moving image of the incorrect answer corresponding to the user-selection from the server through communication therewith.

A seventeenth aspect of the present invention is directed to a recording medium on which a program to be run on a computer is recorded for realizing a learning-support method supporting a user's learning by presenting, to a user, an answer-selectable question and an explanation corresponding to an answer selected by the user. The method comprises presenting a question-screen including a question and moving images as being choices for an answer, receiving a user-selection indicating which of the moving images included in the question-screen presented in the question-screen presenting step is selected by the user, determining whether the user-selection received in the selection receiving step is correct or incorrect, presenting a correct-answer-explanation-screen including an explanation for a correct answer and a correct moving image when the user-selection is determined as correct in the correct/incorrect determining step, and presenting an incorrect-answer-explanation-screen including an explanation for an incorrect answer and the correct moving image when the user-selection is determined as incorrect in the correct/incorrect determining step.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing an example of a table stored in a table storage part 11 in FIG. 1.

FIG. 9 is an example of a question-screen displayed in step S4 of FIG. 8.

FIG. 10 is an another example of the question-screen displayed in step S4 of FIG. 8.

FIG. 11 is still another example of the question-screen displayed in step S4 of FIG. 8.

FIG. 12 is an example of a correct-answer-explanation-screen displayed in step S9 of FIG. 8.

FIG. 16 is a block diagram showing a structure of a learning-support device according to a third embodiment of the present invention.

FIG. 19 is a diagram showing an example of a question-screen displayed by a conventional learning-support device.

FIG. 20 is a diagram showing an example of an explanation-screen displayed by the conventional learning-support device.

DESCRIPTION OF THE PREFERRED EMBODIMENTS

Figure 1:
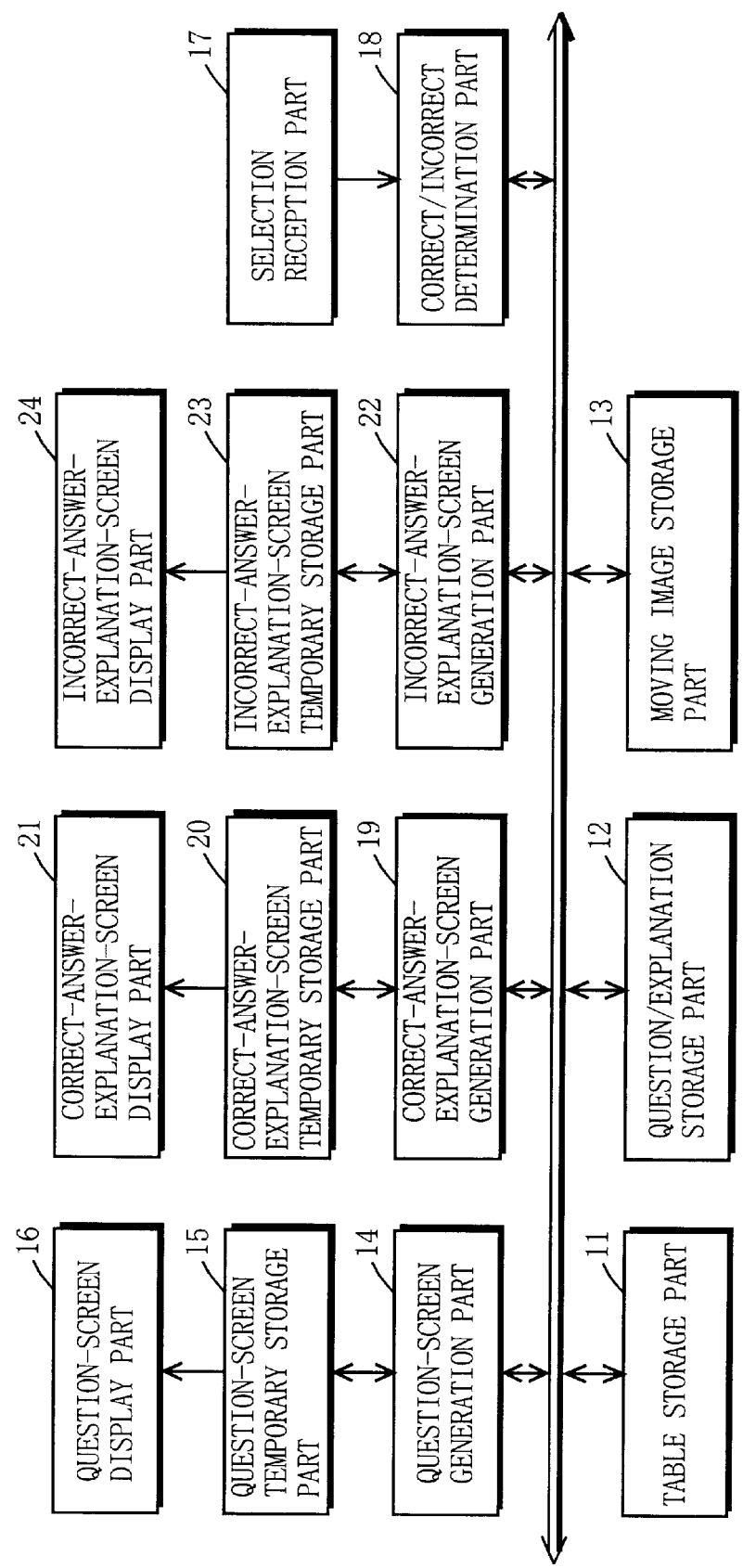
FIG. 1 is a block diagram showing a structure of a learning-support device according to a first (or second) embodiment of the present invention.

Embodiments of the present invention are described by referring to the drawings.

(First Embodiment)

FIG. 1 is a block diagram showing a structure of a learning-support device according to a first embodiment of the present invention. In FIG. 1, the learning-support device of the embodiment includes a table storage part 11, a question/explanation storage part 12, a moving image storage part 13, a question-screen generation part 14, a question-screen temporary storage part 15, a question-screen display part 16, a selection reception part 17, a correct/incorrect determination part 18, a correct-answer-explanation-screen generation part 19, a correct-answer-explanation-screen temporary storage part 20, a correct-answer-explanation-screen display part 21, an incorrect-answer-explanation-screen generation part 22, an incorrect-answer-explanation-screen temporary storage part 23, and an incorrect-answer-explanation-screen display part 24.

The table storage part 11 stores a table. The question/explanation storage part 12 stores groups of questions and explanations. The moving image storage part 13 stores a group of moving images. The question-screen generation part 14 generates a question-screen. The question-screen temporary storage part 15 temporarily stores the question-screen. The question-screen display part 16 displays the question-screen. The selection reception part 17 receives a selection made by a user. The correct/incorrect determination part 18 determines whether the selection made by the user is right or wrong (correct or incorrect). The correct-answer-explanation-screen generation part 19 generates a screen showing the explanation for the correct answer. The correct-answer-explanation-screen temporary storage part 20 temporarily stores the correct-answer-explanation-screen. The correct-answer-explanation-screen display part 21 displays the correct-answer-explanation-screen. The incorrect-answer-explanation-screen generation part 22 generates a screen showing the explanation for the incorrect answer. The incorrect-answer-explanation-screen temporary storage part 23 temporarily stores the incorrect-answer-explanation-screen. The incorrect-answer-explanation-screen display part 24 displays the incorrect-answer-explanation-screen.

Figure 2:
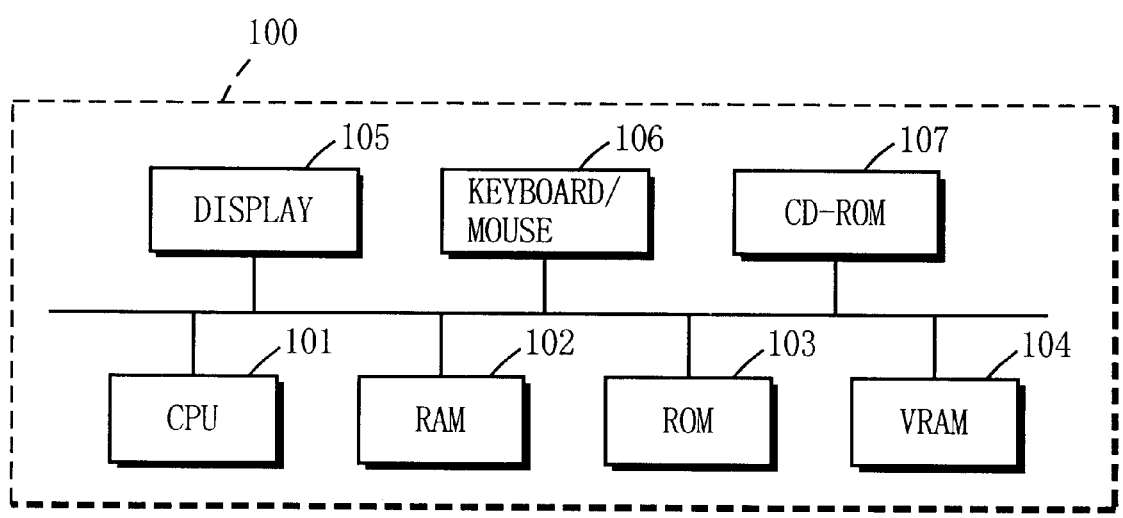
FIG. 2 is a block diagram showing an example of a structure of a computer for realizing the learning-support device in FIG. 1.

FIG. 2 is a block diagram showing an example of a structure of a computer for realizing the learning-support device of FIG. 1. A computer 100, shown in FIG. 2, includes a CPU 101, RAM 102, ROM 103, VRAM 104, a display 105, a keyboard and/or mouse 106, and a CD-ROM 107.

The ROM 103 stores system software programs enabling the start-up of the learning-support device and the operation of the components included therein. The CD-ROM 107 stores the above described table, the group of moving images, the groups of questions and explanations, and also an application program.

When the learning-support device is started up, the application program stored on the CD-ROM 107 is transferred to the RAM 102. The CPU 101 thereafter operates, following the application program received by the RAM 102, by using the RAM 102 and the VRAM 104 as a working space, whereby realizing each of the blocks in FIG. 1.

FIG. 3 is an example of the table stored in the table storage part 11 of FIG. 1. In the table shown in FIG. 3, to each column of answer-selectable questions (first question, second question, third question, and so forth), columns for a question, a correct answer, first to third choices, an explanation for correct answer, and an explanation for incorrect answer are appended.

Figure 4:
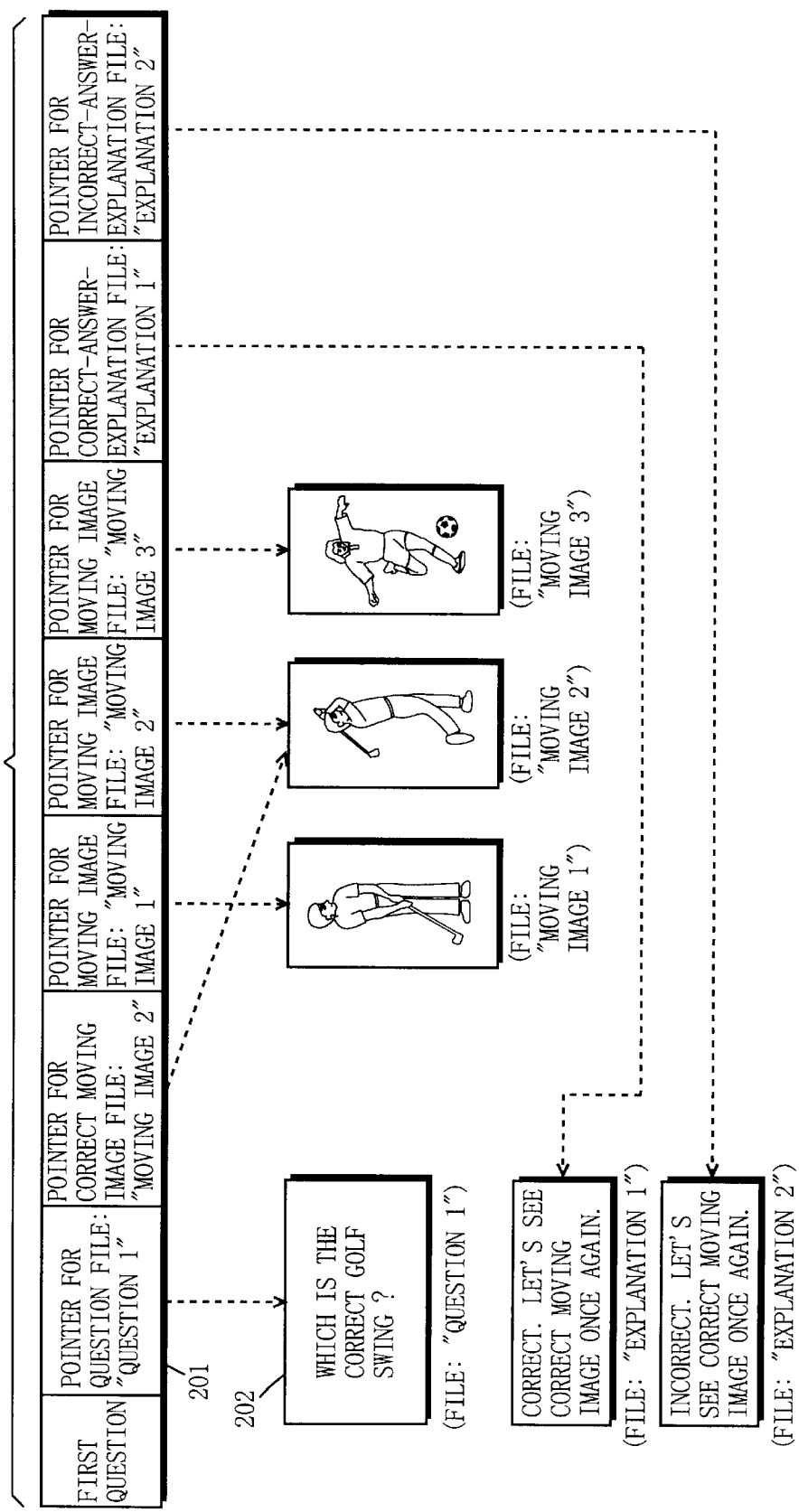
FIG. 4 is a diagram showing information described in each column of the table shown in FIG. 3 in visual form.

FIG. 4 is a diagram showing information described in each column of the table shown in FIG. 3 in visual form. In FIG. 4, "question 1" described in a question column 201 of the first question, for example, is a pointer pointing a body (document file) 202 of "question 1" stored in the question/explanation storage part 12. Such pointer may be, for example, a file name or an address of the file in the storage.

Figure 5:
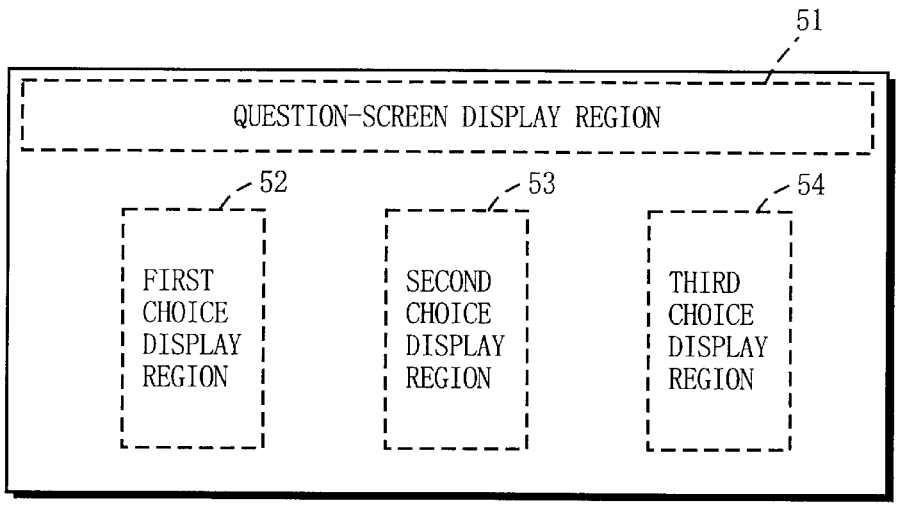
FIG. 5 is a diagram showing an example of a layout of a question-screen generated by a question-screen generation part 14 in FIG. 1.

FIG. 5 is an example of the layout of the screen generated by the question-screen generation part 14 in FIG. 1. The question-screen shown in FIG. 5 includes a question display region 51, and first to third choice display regions 52 to 54.

A question read out from the question/explanation storage part 12 is pasted on the question display region 51. Moving images differing from each other are read out from the moving image storage part 13 and embedded in the first to third choice display regions 52 to 54, respectively, as the first to third choices.

Figure 6:
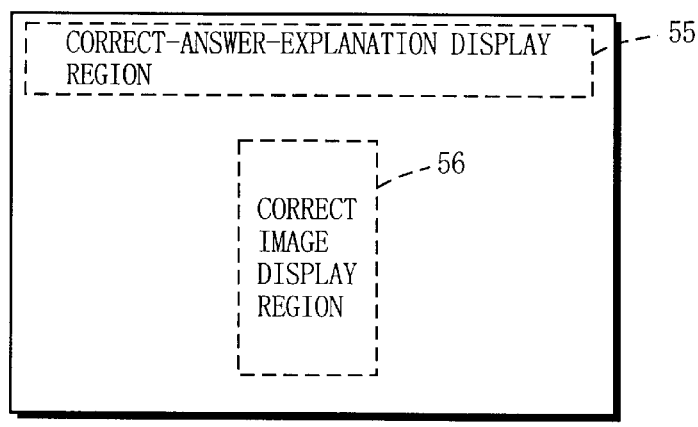
FIG. 6 is a diagram showing an example of a layout of a correct-answer-explanation-screen generated by a correct-answer-explanation-screen generation part 19 in FIG. 1.

FIG. 6 is an example of the layout of the screen generated by the correct-answer-explanation-screen generation part 19 in FIG. 1. The correct-answer-explanation-screen shown in FIG. 6 includes a correct-answer-explanation display region 55 and a correct image display region 56.

An explanation for the correct answer read out from the question/explanation storage part 12 is pasted on the correct-answer-explanation display region 55. A correct moving image is read out from the moving image storage part 13 and embedded in the correct image display region 56.

Figure 7:
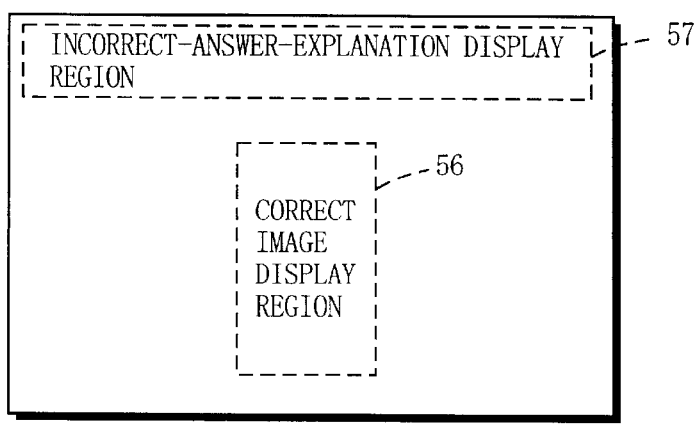
FIG. 7 is a diagram showing an example of a layout of an incorrect-answer-explanation-screen generated by an incorrect-answer-explanation-screen generation part 22 in FIG. 1.

FIG. 7 is an example of the layout of the screen generated by the incorrect-answer-explanation-screen generation part 22 in FIG. 1. As shown in FIG. 7, the incorrect-answer-explanation-screen includes an incorrect-answer-explanation display region 57 and the correct image display region 56.

An explanation for the incorrect answer read out from the question/explanation storage part 12 is pasted on the incorrect-answer-explanation display region 57. The correct moving image is read out from the moving image storage part 13 and embedded in the correct image display region 56.

Described below is the operation of the learning-support device structured as above.

Figure 8:
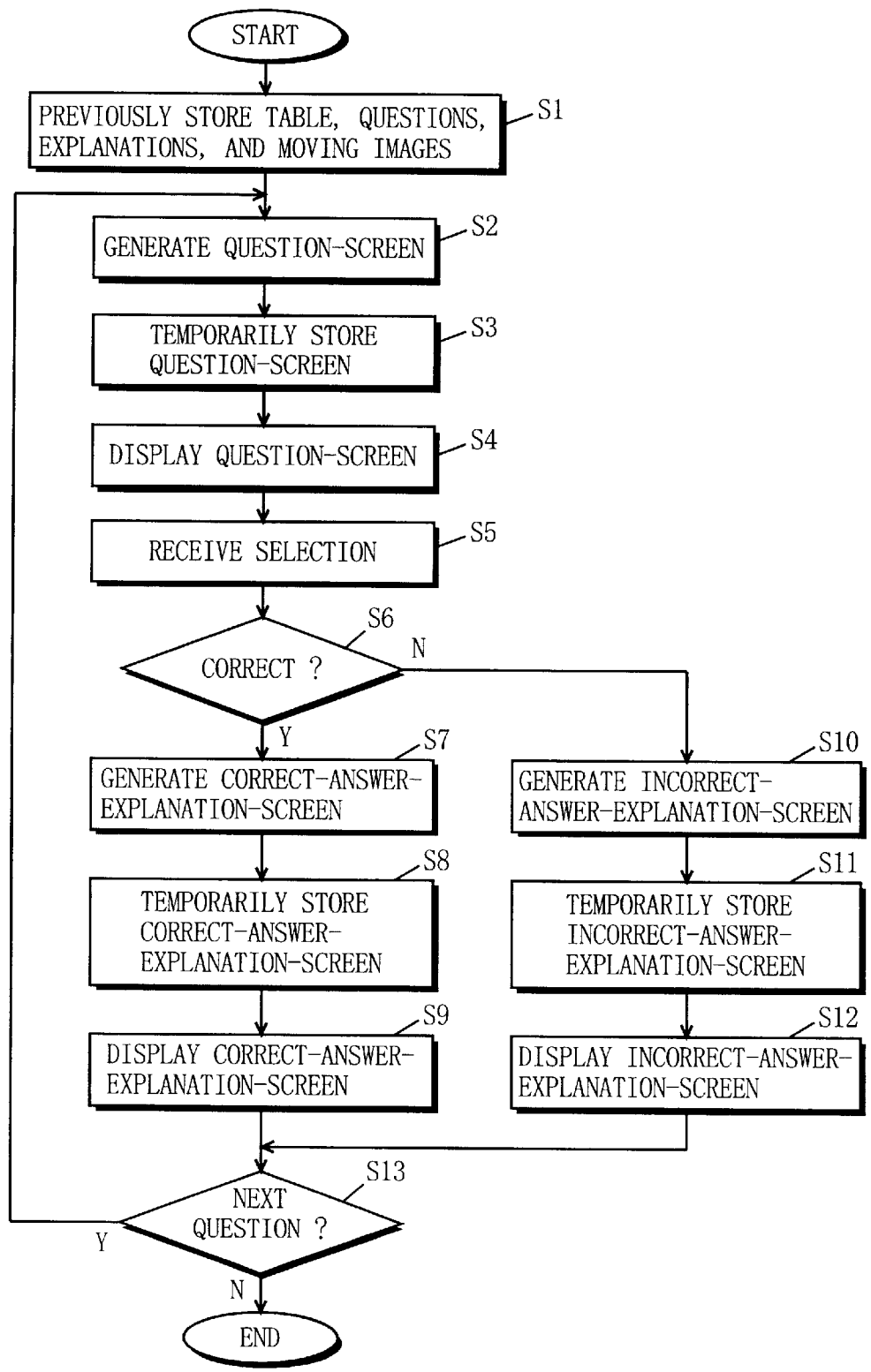
FIG. 8 is a flowchart showing a operation of the learning-support device in FIG. 1.

FIG. 8 is a flowchart showing the operation of the learning-support device shown in FIG. 1. First, in FIG. 8, the table, the question and explanation groups, and the moving image group are recorded, in advance, in the table storage part 11, the question/explanation storage part 12, the moving image storage part 13, respectively (step S1). Thereafter, the question-screen generation part 14 generates a question-screen of the first question (step S2), and the generated screen is temporarily stored in the question-screen temporary storage part 15 (step S3).

The processing for generating and temporary storing the question-screen in steps S2 and S3 is specifically performed in the following manner. The question-screen generation part 14 first generates the screen (background) shown in FIG. 5. The generated screen is temporarily stored in the question-screen temporary storage part 15. The question-screen generation part 14 then refers to the table shown in FIG. 3 for the line indicating the first question and reads out "question 1", which corresponds to the first question on the table (see FIG. 4), from the question/explanation storage part 12. The read out question is pasted on the question display region 51 of the question-screen stored in the question-screen temporary storage part 15. Thereafter, "moving image 1", "moving image 2" and "moving image 3" are sequentially read out from the moving image storage part 13 as the first to third choices (see FIG. 4), and are embedded in the first to third choice display regions 52 to 54, respectively.

The question-screen display part 16 displays the question-screen stored in the question-screen temporary storage part 15 in step S3 (step S4). FIGS. 9 to 11 are examples of the question-screen displayed in step S4. The question ("question 1") and three moving images ("moving image 1", "moving image 2", and "moving image 3") as the choices are shown in each of the question-screens shown in FIGS. 9 to 11. Three moving images are first displayed as still images and after an elapse of a predetermined time period, for example, five seconds, are started at once to be replayed for the same time period and stopped at once.

Alternatively, it is also possible to display a replay-start button on each of the question-screens, shown in FIGS. 9 to 11, whereby clicking the button starts replaying the moving images at once.

Further alternatively, the moving images may be replayed one by one.

The user selects one of the three choices presented on the question-screen displayed in step S4. For such a selection, if the question-screen shown in FIG. 9 is displayed, the user clicks any one of the screen regions displaying the moving images. If the question-screen shown in FIG. 10 is displayed, the user fills in an answering space provided on tho screen with any one of the numbers each indicating one of the moving images. If the question-screen shown in FIG. 11 is displayed, the user presses any one of the buttons provided above the moving images. The thus selected choice (hereinafter referred to as user-selection) is received by the selection reception part 17 (step S5). Note that the description is made below on the assumption that the user mistakenly selects "moving image 1", while the correct answer is "moving image 2".

The correct/incorrect determination part 18 determines whether or not the selection received by the selection reception part 17 in step S5 is correct by referring to the table in the table storage part 11 (step S6). That is, the correct/incorrect determination part 18 a makes determination on the basis of whether a file name of the moving image selected by the user matches the file name of the moving image described in the correct-answer column of the first question in the table.

If determined Yes in step S6, the correct-answer-explanation-screen generation part 19 generates the correct-answer-explanation-screen (step S7), and the generated screen is temporarily stored in the correct-answer-explanation-screen temporary storage part 20 (step S8).

The processing for generating and temporarily storing the correct-answer-explanation-screen in steps S7 and S8 is specifically performed in the following manner. The correct-answer-explanation-screen generation part 19 first generates the screen (background) shown in FIG. 6. The generated screen is temporarily stored in the correct-answer-explanation-screen temporary storage part 20. The correct-answer-explanation-screen generation part 19 then refers to the table shown in FIG. 3 for the line indicating the first question and reads out "explanation 1", which corresponds to the explanation for the correct answer of the first question (see FIG. 4), from the question/explanation storage part 12. The read out explanation is pasted on the correct-answer-explanation display region 55 of the screen stored in the correct-answer-explanation-screen temporary storage part 20. Thereafter, "moving image 2", which corresponds to the correct answer (see FIG. 4), is read out from the moving image storage part 13 and embedded in the correct image display region 56.

The correct-answer-explanation-screen display part 21 displays the explanation-screen stored in the correct-answer-explanation-screen temporary storage part 20 in step S8 (step S9). FIG. 12 is an example of the correct-answer-explanation-screen displayed in step S9. In FIG. 12, the explanation for the correct answer and the correct moving image ("explanation 1" and "moving image 2") are shown on the explanation-screen. Herein, the moving image is first displayed as the still image. After an elapse of a predetermined time period, for example, five seconds, the image is started to be replayed for a predetermined time period and stopped. Alternatively, it is also possible to display a replay-start button on the correct-answer-explanation-screen shown in FIG. 12, whereby clicking the button starts replaying the moving image.

If determined No in step S6, the incorrect-answer-explanation-screen generation part 22 generates the incorrect-answer-explanation-screen (step S10), and the generated screen is temporarily stored in the incorrect-answer-explanation-screen temporary storage part 23 (step S11).

The processing for generating and temporarily storing the incorrect-answer-explanation-screen in steps S10 and S11 is specifically performed in the following manner. The incorrect-answer-explanation-screen generation part 22 first generates the screen (background) shown in FIG. 7. The generated screen is temporarily stored in the incorrect-answer-explanation-screen temporary storage part 23. The incorrect-answer-explanation-screen generation part 22 then refers to the table shown in FIG. 3 for the line indicating the first question and reads out "explanation 2", which corresponds to the explanation for the incorrect answer of the first question (see FIG. 4), from the question/explanation storage part 12. The read out explanation is pasted on the incorrect-answer-explanation display region 57 of the screen stored in the incorrect-answer-explanation-screen temporary storage part 23. Thereafter, "moving image 2", which corresponds to the correct answer (see FIG. 4), is read out from the moving image storage part 13 and embedded in the correct image display region 56.

Figure 13:
FIG. 13 is an example of an incorrect-answer-explanation-screen displayed in step S12 of FIG. 8.

The incorrect-answer-explanation-screen display part 24 displays the explanation-screen stored in the incorrect-answer-explanation-screen temporary storage part 23 in step S11 (step S12). FIG. 13 is an example of the incorrect-answer-explanation-screen displayed in step S12. In FIG. 13, the explanation for the incorrect answer ("explanation 2") and the correct moving image ("moving image 2") are shown on the explanation-screen. The moving image is first displayed as the still image. After an elapse of a predetermined time period, for example, five seconds, the image is started to be replayed for a predetermined time period and stopped. Alternatively, it is also possible to display a replay-start button on the incorrect-answer-explanation-screen shown in FIG. 13, whereby clicking the button starts replaying the moving image.

When the processing in steps S9 or S12 for displaying the explanation-screen ends, the determination is made on whether or not to proceed to the next question (step S13). If Yes, the procedure from step S2 and onwards is repeated for the next answer-selectable question (second question). If No, the learning-support device stops its operation.

As described in the foregoing, according to the first embodiment, the moving images are aligned on the screen as the choices for the user to select one he/she considers as correct. Accordingly, learning can be effectively performed even in such a field that sets its goal on mastering a motion itself. Further, the unerring understanding of the correct motion is possible by once again displaying the correct moving image with the explanation in written language. As a result, sufficient learning effect is expected.

In a case of learning golf swings, the question-screen presents choices of swing motions. The user, therefore, can make a selection from among the presented choices after carefully examining the minute difference thereamong. Further, the moving image of the correct swing motion is once again presented with the explanation in written language, enabling the effective learning of the correct swing motion.

(Second Embodiment)

The structure of a learning-support device according to a second embodiment of the present invention is the same as that according to the first embodiment, and therefore, FIG. 1 is referred to again for the following description. A computer for realizing the learning-support device of this embodiment also has the same structure as that shown in FIG. 2, and therefore, the same drawing is referred to again. For the same reason, FIGS. 3, 4, 5, 6, and 8 are also referred to again for the description in the second embodiment. FIGS. 3, 4, 5, 6, and 8 are respectively showing the table stored in the table storage part 11, the information described in each column on the table, the layout of the question-screen generated by the question-screen generation part 14, the layout of the correct-answer-explanation-screen generated by the correct-answer-explanation-screen generation part 19, and the basic operation of the learning-support device.

The second embodiment differs from the first embodiment only in that, when the user mistakenly selected an incorrect image, the incorrect image selected by the user is displayed together with the incorrect-answer-explanation and the correct image on the incorrect-answer-explanation-screen generated by the incorrect-answer-explanation-screen generation part 22. Therefore, the description below is made in detail only for this difference.

Figure 14:
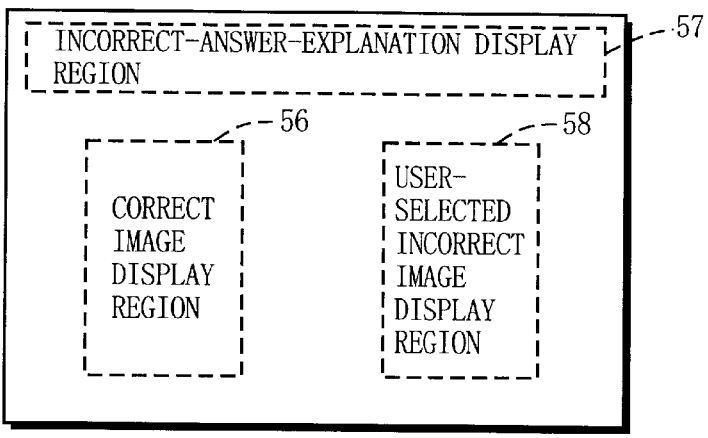
FIG. 14 is a diagram showing an example of a layout of the incorrect-answer-explanation-screen generated by the incorrect-answer-explanation-screen generation part 22 (second embodiment) in FIG. 1.

FIG. 14 is an example of the layout of the screen generated by the incorrect-answer-explanation-screen generation part 22 in FIG. 1. As shown in FIG. 14, the incorrect-answer-explanation-screen includes the incorrect-answer-explanation display region 57, the correct image display region 56, and an incorrect image display region 58 for displaying the incorrect image selected by the user.

The explanation for the incorrect answer read out from the question/explanation storage part 12 is pasted on the incorrect-answer-explanation display region 57. The correct moving image is read out from the moving image storage part 13 and embedded in the correct image display region 56. The incorrect moving image selected by the user is read out from the moving image storage part 13 and embedded in the incorrect image display region 58.

The basic operation of the learning-support device structured as above is the same as that of the first embodiment except for the partial difference in the processing in steps S10 and S11. Consequently, the contents of the incorrect-answer-explanation-screen displayed in step S12 partially differ from that of the first embodiment.

In FIG. 8, the processing for generating and temporarily storing the incorrect-answer-explanation-screen in steps S10 and S11 is specifically performed in the following manner. The incorrect-answer-explanation-screen generation part 22 first generates the screen (background) shown in FIG. 14. The generated screen is temporarily stored in the incorrect-answer-explanation-screen temporary storage part 23. The incorrect-answer-explanation-screen generation part 22 then refers to the table shown in FIG. 3 for the line indicating the first question and reads out "explanation 2", which corresponds to the explanation for the incorrect answer of the first question (see FIG. 4), from the question/explanation storage part 12. The read out explanation is pasted on the incorrect-answer-explanation display region 57 of the screen stored in the incorrect-answer-explanation-screen temporary storage part 23. Thereafter, "moving image 2", which is the correct answer (see FIG. 4), is read out from the moving image storage part 13 and embedded in the correct image display region 56. Further, "moving image 1", which is the incorrect image selected by the user, is read out from the moving image storage part 13 and embedded in the incorrect image display region 58.

Figure 15:
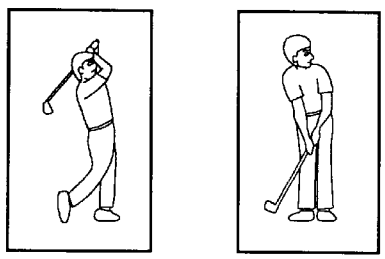
FIG. 15 is an example of the incorrect-answer-explanation-screen displayed in step S12 (second embodiment) of FIG. 8.

FIG. 15 is an example of the incorrect-answer-explanation-screen displayed in step S12 by the incorrect-answer-explanation-screen display part 24. In FIG. 15, the explanation for the incorrect answer ("explanation 2"), the correct moving image ("moving image. 2"), and the incorrect moving image selected by the user ("moving image 1") are shown on the explanation-screen. Two moving images are first displayed as still images. After an elapse of a predetermined time period, for example, five seconds, the images are started to be replayed at once for the same time period and stopped at once.

Alternatively, it is also possible to display a replay-start button on the explanation-screen shown in FIG. 15, whereby the user clicks the button to start replaying the moving images at once, Further alternatively, the moving images may be replayed one by one.

As described in the foregoing, according to the second embodiment, as compared to the first embodiment, when the selected image is incorrect, such incorrect moving image is displayed in alignment with the correct moving image on the explanation screen, thereby allowing the user to promptly and correctly understand why the moving image he/she selected is incorrect. As a result, more effective leaning of the correct motion becomes possible.

In a case of learning golf swings, when the selected swing motion is incorrect, the correct swing motion and the incorrect swing motion are aligned and displayed together on the explanation screen, thereby allowing the user to promptly and correctly understand why the swing motion he/she selected is incorrect. As a result, more effective learning of the correct swing motion becomes possible.

When the selected answer is wrong, the incorrect moving image and the correct moving image may be separately displayed, for example, by displaying the incorrect moving image first and the correct moving image thereafter. In this manner, however, if the difference between two motions is minute, such a difference is not easily distinguishable. On the other hand, when two moving images are aligned and displayed at the same time, the minute difference therebetween is clearly distinguishable.

(Third Embodiment)

FIG. 16 is a block diagram showing the structure of a learning-support device according to a third embodiment of the present invention. The learning-support device in FIG. 16, as compared to the learning-support device shown in FIG. 1, is additionally provided with a communications part 25 as an alternative to the question/explanation storage part 12 and the moving image storage part 13.

Each of the components shown in FIG. 16, except the communications part 25, operates in a similar manner to those described in FIG. 1, but the table storage part 11, the question-screen generation part 14, the correct-answer-explanation-screen generation part 19, and the incorrect-answer-explanation-screen generation part 22 obtain information (table, questions, explanations, moving images) from a server 110 (see FIG. 17) on a network 109 through the communications part 25.

Figure 17:
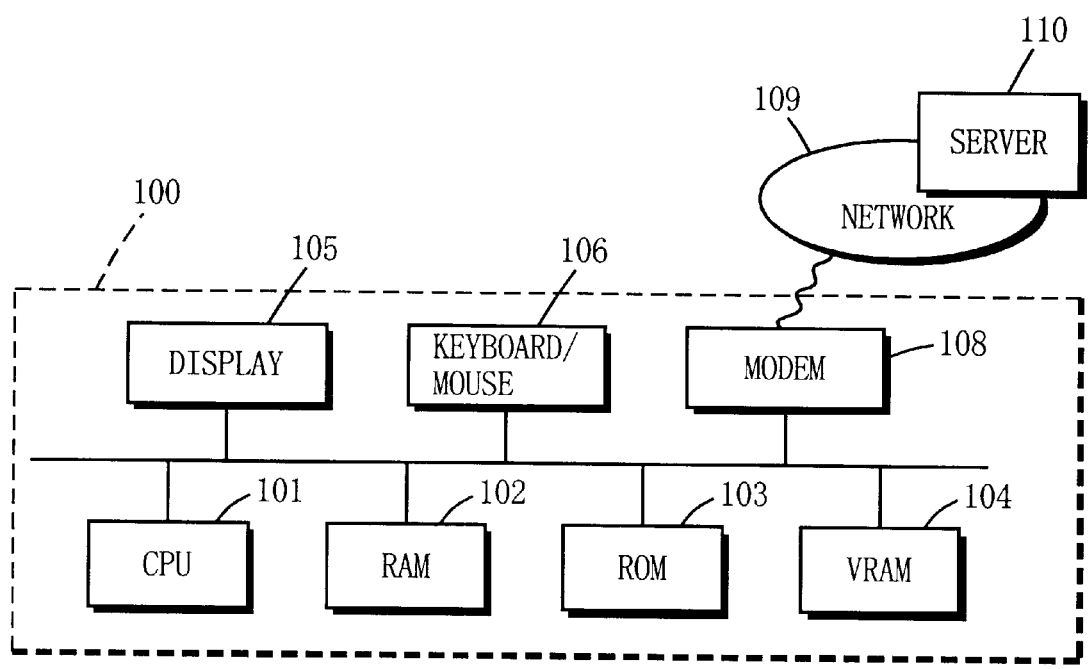
FIG. 17 is a block diagram showing an example of a structure of a computer system for realizing the learning-support device in FIG. 16.

FIG. 17 is a block diagram showing an example of the structure of a computer system for realizing the learning-support device of FIG. 16. The computer system shown in FIG. 17 is structured by the computer 100 and the server 110 provided on the network 109. The computer 100 includes the CPU 101, the RAM 102, the ROM 103, the VRAM 104, the display 105, the keyboard and/or mouse 106, and a modem 108.

The server 110 on the network 109 stores the above described table, the group of moving images, the groups of questions and explanations, and the application program.

The ROM 103 stores the system software programs enabling the start-up of the learning-support device and the operation of the above described components. The modem 108 provides the computer 100 with access to the network 109.

When the learning-support device is started up, the application program stored in the server 110 is downloaded through the network 109 to the computer 100 and further transferred to the RAM 102. The CPU 101 thereafter operates, following the application program in the RAM 102, by using the RAM 102 and the VRAM 104 as a working space, whereby realizing each of the blocks in FIG. 16.

A table stored in the table storage part 11 of FIG. 16 is the same as that described in the first embodiment, and therefore, FIG. 3 is referred to again for the following description. Information described in each column on the table is the same as the pointer according to the first embodiment, and therefore, FIG. 4 is also referred to again. Note that herein, specific examples of the pointers are URL addresses indicating the addresses of files in the server 110.

The layouts of the screens generated by the question-screen generation part 14 and the correct-answer-explanation-screen generation part 19 in FIG. 16 are both same as those described in the first embodiment, and therefore, FIGS. 5 and 6 are referred to again for the following description. The layout of the screen generated by the incorrect-answer-explanation-screen generation part 22 is similar to that described in either the first or the second embodiment, and therefore, FIG. 7 or 14 is referred to again.

Described below is the operation of the learning-support device structured as above.

Figure 18:
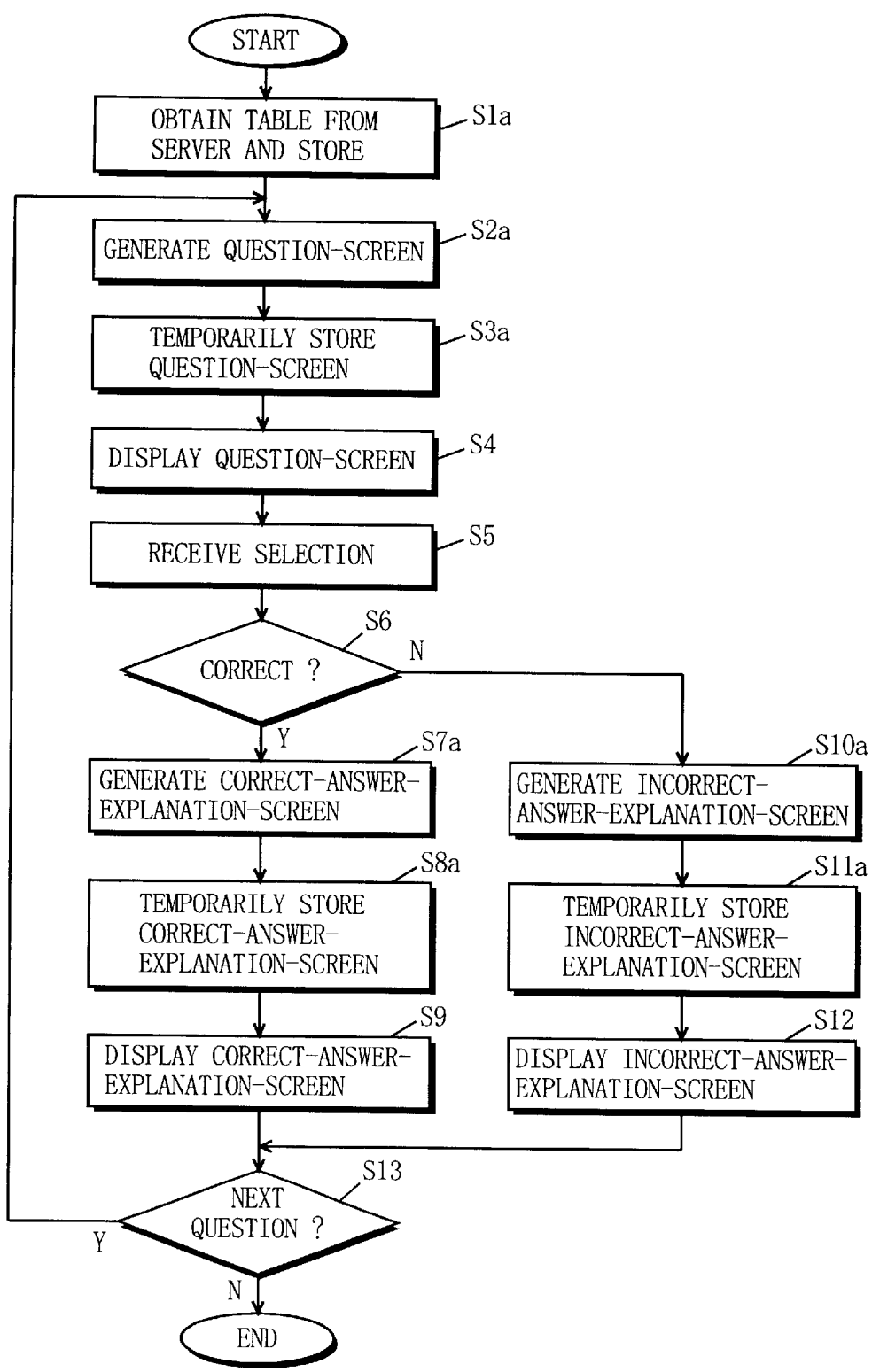
FIG. 18 is a flowchart showing an operation of the learning-support device in FIG. 16.

FIG. 18 is a flowchart showing the operation of the learning-support device shown in FIG. 16. Since steps S4 to S6, S9, S12, and S13 shown in FIG. 18 are the same procedure as those shown in FIG. 8, the detailed description thereof is omitted.

In FIG. 18, the table group, the question and explanation groups, the moving image group are accumulated in the server 110 on the network 109. Each question, each explanation, and each moving image are assigned URL addresses.

First, the table storage part 11 obtains the table from the server 110 for storage (step S1a). Thereafter, the question-screen generation part 14 generates the question-screen of the first question (step S2a). The generated screen is temporarily stored in the question-screen temporary storage part 15 (step S3a).

The processing for generating and temporarily storing the question-screen in steps S2a and S3a is specifically performed in the following manner. The question-screen generation part 14 first generates the screen (background) shown in FIG. 5. The generated screen is temporarily stored in the question-screen temporary storage part 15. The question-screen generation part 14 then refers to the table shown in FIG. 3 for the line indicating the first question and obtains "question 1", which corresponds to the first question on the table (see FIG. 4), from the server 110 through the communications part 25. The obtained question is pasted on the question display region 51 of the question-screen stored in the question-screen temporary storage part 15. Thereafter, "moving image 1", "moving image 2" and "moving image 3" are sequentially obtained from the server 110 through the communications part 25 as the first to third choices (see FIG. 4), and are embedded in the first to third choice display regions 52 to 54, respectively.

The question-screen display part 16 displays the question-screen stored in the question-screen temporary storage part 15 in step S3a (step S4). The user then selects one from among three choices presented on the question-screen displayed in step S4. The user-selection is received by the selection reception part 17 (step S5). The correct/incorrect determination part 18 determines whether or not the user-selection received by the selection reception part 17 in step S5 is correct by referring to the table in the table storage part 11 (step S6).

If determined Yes in step S6, the correct-answer-explanation-screen generation part 19 generates the correct-answer-explanation-screen (step S7a), and the generated screen is temporarily stored in the correct-answer-explanation-screen temporary storage part 20 (step S8a).

The processing for generating and temporarily storing the correct-answer-explanation-screen in steps S7a and S8a is specifically performed in the following manner. The correct-answer-explanation-screen generation part 19 first generates the screen (background) shown in FIG. 6. The generated screen is temporarily stored in the correct-answer-explanation-screen temporary storage part 20. The correct-answer-explanation-screen generation part 19 then refers to the table shown in FIG. 3 for the line indicating the first question and obtains "explanation 1", which corresponds to the explanation for the correct answer (see FIG. 4), from the server 110 through the communication part 25. The obtained explanation is pasted on the correct-answer-explanation display region 55 of the screen stored in the correct-answer-explanation-screen temporary storage part 20. Thereafter, "moving image 2", which is the correct answer (see FIG. 4), is obtained from the server 110 through the communications part 25 and embedded in the correct image display region 56.

The correct-answer-explanation-screen display part 21 displays the explanation-screen stored in the correct-answer-explanation-screen temporary storage part 20 in step S8a (step S9).

If determined No in step S6, the incorrect-answer-explanation-screen generation part 22 generates the incorrect-answer-explanation-screen (step S10a), and the generated screen is temporarily stored in the incorrect-answer-explanation-screen temporary storage part 23 (step S11a).

The processing for generating and temporarily storing the incorrect-answer-explanation-screen in steps S10a and S11a is specifically performed in the following manner. The incorrect-answer-explanation-screen generation part 22 first generates the screen (back ground) shown in FIG. 7. The generated screen is temporarily stored in the incorrect-answer-explanation-screen temporary storage part 23. The incorrect-answer-explanation-screen generation part 22 then refers to the table shown in FIG. 3 for the line indicating the first question, and obtains "explanation 2", which is the explanation for the incorrect answer (see FIG. 4), from the server 110 through the communications part 25. The obtained explanation is pasted on the incorrect-answer-explanation display region 57 of the screen stored in the incorrect-answer-explanation-screen temporary storage part 23. Thereafter, "moving image 2", which is the correct answer (see FIG. 4), is obtained from the server 110 through the communications part 25 and embedded in the correct image display region 56.

Alternatively, the processing for generating and temporarily storing the incorrect-answer-explanation-screen in steps S10a and S11a may be specifically performed in the following manner. The incorrect-answer-explanation-screen generation part 22 first generates the screen (background) shown in FIG. 14. The generated screen is temporarily stored in the incorrect-answer-explanation-screen temporary storage part 23. The incorrect-answer-explanation-screen generation part 22 then refers to the table shown in FIG. 3 for the line indicating the first question, and obtains "explanation 2", which corresponds to the explanation for the incorrect answer of the first question (see FIG. 4), from the server 110 through the communications part 25. The obtained explanation is pasted on the incorrect-answer-explanation display region 57 of the screen stored in the incorrect-answer-explanation-screen temporary storage part 23. Thereafter, "moving image 2", which is the correct answer (see FIG. 4), is obtained from the server 110 through the communications part 25 and embedded in the correct image display region 56 in the stored explanation-screen. Further, "moving image 1", which is the incorrect image selected by the user, is obtained from the server 110 through the communications part 25 and embedded in the incorrect image display region 58.

The incorrect-answer-explanation-screen display part 24 displays the explanation-screen stored in the incorrect-answer-explanation-screen temporary storage part 23 in step S11a (step S12).

When processing in steps S9 or S12 for displaying the explanation-screen ends, a determination is made on whether or not to proceed to the next question. If Yes, the procedure from step S2a and onwards is repeated for the next answer-selectable question (second question). If No, the learning-support device stops its operation.

Note that the description in this embodiment has been made on the assumption that the application program is previously stored in the server 110 to be downloaded therefrom to the learning-support device through the network 109. The application program, however, may be recorded on a portable recording medium such as the CD-ROM 107 and provided to the learning-support device or users. The table is also assumed to be previously stored in the server 110 to be downloaded by the learning-support device, but may be recorded on the portable recording medium together with the application program and provided to the learning-support device (user).

As described in the foregoing, in the third embodiment, the following effect is obtained in addition to those described in the first and the second embodiments. That is, the learning-support device can have a wide variety of and updated answer-selectable questions by communicating with the server 110 to obtain the questions, moving images, and explanations. Herein, as adverse effects, communication costs are required and the response of the device may slow down depending on the access condition to the server 110 and the communications status therewith.

On the other hand, in the first and the second embodiments, the learning-support device itself previously stores the question group, moving image group, and explanation groups. For example, such information is stored in an internally fixed hard disk or on the CD-ROM 107 that can be loaded into the device. As a result, no communications cost is required and the stable response of the device is achieved, but the number of presentable questions is limited.

Note, in the present invention, a question-screen and an explanation-screen may be each displayed on the entire display screen or on one or a plurality of windows thereon.

While the invention has been described in detail, the foregoing description is in all aspects illustrative and not restrictive. It is understood that numerous other modifications and variations can be devised without departing from the scope of the invention.

What is claimed is:

1. A learning-support device comprising:

question-screen presentation means for presenting a question-screen including a question and moving images as choices for an answer to the question;

selection reception means for receiving a user-selection indicating which of the moving images included in the question-screen presented by said question-screen presentation means is selected by a user;

correct/incorrect determination means for determining whether the user-selection received by said selection reception means is correct or incorrect;

first explanation-screen presentation means for presenting a correct-answer-explanation-screen including an explanation for a correct answer and a correct moving image when said correct/incorrect determination means determines that the user-selection is correct; and second explanation-screen presentation means for presenting an incorrect-answer-explanation-screen including an explanation for an incorrect answer and the correct moving image from the moving images presented by said question-screen presentation means as the choices for the answer when said correct/incorrect determination means determines that the user-selection is incorrect.

2. The learning-support device according to claim 1, further comprising:

first storage means for storing a group of questions, a group of moving images, and a group of explanations; and second storage means for storing a table providing information pointing out, for each answer-selectable question, the question, the moving images as the choices for the answer, the correct moving image, and the explanations for the correct and incorrect answers to be read out from the group of questions, the group of moving images, and the group of explanations stored in said first storage means, wherein said question-screen presentation means generates the question-screen by referring to the table stored in said second storage means and reading out the question and the moving images as the choices for the answer from said first storage means, said first explanation-screen presentation means generates the correct-answer-explanation-screen by referring to the table stored in said second storage means and reading out the explanation for the correct answer and the correct moving image from said first storage means, and said second explanation-screen presentation means generates the incorrect-answer-explanation-screen by referring to the table stored in said second storage means and reading out the explanation for the incorrect answer and the correct moving image from said first storage means.

3. The learning-support device according to claim 1, wherein the incorrect-answer-explanation-screen presented by said second explanation-screen presentation means further includes a moving image of the incorrect answer corresponding to the user-selection.

4. The learning-support device according to claim 2, wherein said second explanation-screen presentation means further reads out a moving image of the incorrect answer corresponding to the user-selection from said first storage means.

5. The learning-support device according to claim 1, further comprising:

a server being operable to store a group of questions, a group of moving images, and a group of explanations; and table storage means for storing a table providing information pointing out, for each answer-selectable question, the question, the moving images as the choices for the answer, the correct moving image, and the explanations for the correct and incorrect answers to be obtained from the group of questions, the group of moving images, and the group of explanations stored in said server; and communications means for communicating with said server, wherein said question-screen presentation means generates the question-screen by referring to the table stored in said table storage means and obtaining the question, and the moving images as the choices for the answer from said server through said communications means, said first explanation-screen presentation means generates the correct-answer-explanation-screen by referring to the table stored in said table storage means and obtaining the explanation for the correct answer and the correct moving image from said server through said communications means, and said second explanation-screen presentation means generates the incorrect-answer-explanation-screen by referring to the table stored in said table storage means and obtaining the explanation for the incorrect answer and the correct moving image from said server through said communications means.

6. The learning-support device according to claim 5, wherein the table is stored in said server, and said table storage means obtains the table from said server through said communications means.

7. The learning-support device according to claim 5, wherein the incorrect-answer-explanation-screen presented by said second explanation-screen presentation means further includes a moving image of the incorrect answer corresponding to the user-selection.

8. The learning-support device according to claim 7, wherein said second explanation-screen presentation means generates the incorrect-answer-explanation-screen by referring to the table stored in said table storage means and further obtains the moving image of the incorrect answer corresponding to the user-selection from said server through said communications means.

9. A learning-support method comprising:

presenting a question-screen including a question and moving images as choices for an answer to the question;

receiving a user-selection indicating which of the moving images included in the question-screen presented in said question-screen presenting operation is selected by a user;

determining whether the user-selection received in said selection receiving operation is correct or incorrect;

presenting a correct-answer-explanation-screen including an explanation for a correct answer and a correct moving image when the user-selection is determined as correct in said correct/incorrect determining operation; and presenting an incorrect-answer-explanation-screen including an explanation for an incorrect answer and the correct moving image from the moving images presented in said presenting of the question operation as the choices for the answer when the user-selection is determined as incorrect in said correct/incorrect determining operation.

10. The learning-support method according to claim 9, further comprising:

storing a group of questions, a group of moving images, and a group of explanations; and storing a table providing information pointing out, for each answer-selectable question, the question, the moving images as the choices for the answer, the correct moving image, and the explanations for the correct and incorrect answers to be selected from the group of questions, the group of moving images, and the group of explanations which are stored in said table storing operation, wherein said question-screen presenting operation comprises generating the question-screen by referring to the table stored in said table storing operation and selecting the question and the moving images as the choices for the answer from the group of questions and the group of moving images stored in said group storing operation, said correct-answer-explanation-screen presenting operation comprising generating the correct-answer-explanation-screen by referring to the table stored in said table storing operation and selecting the explanation for the correct answer and the correct moving image from the group of moving images and the group of explanations stored in said group storing operation, and said incorrect-answer-explanation-screen presenting operation comprising generating the incorrect-answer-explanation-screen by referring to the table stored in said table storing operation and selecting the explanation for the incorrect answer and the correct moving image from the group of moving images and the group of explanations stored in said group storing operation.

11. The learning-support method according to claim 9, wherein the incorrect-answer-explanation-screen presented in said incorrect-answer-explanation-screen presenting operation further includes a moving image of the incorrect answer corresponding to the user-selection.

12. The learning-support method according to claim 10, wherein said incorrect-answer-explanation-screen presenting operation further comprises selecting a moving image of the incorrect answer corresponding to the user-selection from the group of moving images stored in said group storing operation.

13. The learning-support method according to claim 9, further comprising:

storing a group of questions, a group of moving images, and a group of explanations in a server; and storing a table providing information pointing out, for each answer-selectable question, the question, the moving images as the choices for the answer, the correct moving image, and the explanations for the correct and incorrect answers to be obtained from the group of questions, the group of moving images, and the group of explanations which are stored in the server, wherein said question-screen presenting operation comprises generating the question-screen by referring to the table stored in said table storing operation and obtaining the question and the moving images as the choices for the answer from the server through communications, said correct-answer-explanation-screen presenting operation comprises generating the correct-answer-explanation-screen by referring to the table stored in said table storing operation and obtaining the explanation for the correct answer and the correct moving image from the server through communications, and said incorrect-answer-explanation-screen presenting operation comprises generating the incorrect-answer-explanation-screen by referring to the table stored in said table storing operation and obtaining the explanation for the incorrect answer and the correct moving image from the server through communications.

14. The learning-support method according to claim 13, wherein the table is stored in the server, and said table storing operation comprises obtaining the table from the server through communications.

15. The learning-support method according to claim 13, wherein the incorrect-answer-explanation-screen presented in said incorrect-answer-explanation-screen presenting operation further includes a moving image of the incorrect answer corresponding to the user-selection.

16. The learning-support method according to claim 15, wherein said incorrect-answer-explanation-screen presenting operation comprises generating the incorrect-answer-explanation-screen by referring to the table stored in said table storing operation and further obtaining the moving image of the incorrect answer corresponding to the user-selection from the server through communications.

17. A computer program embodied on a computer readable medium for use with a computer for carrying out a learning-support method, said computer program comprising:

computer readable program code operable to present a question-screen including a question and moving images as choices for an answer to the question;

computer readable program code operable to receive a user-selection indicating which of the moving images included in the question-screen presented by said question-screen presenting program code is selected by a user;

computer readable program code operable to determine whether the user-selection received by said selection receiving program code is correct or incorrect;

computer readable program code operable to present a correct-answer-explanation-screen including an explanation for a correct answer and a correct moving image when the user-selection is determined as correct by said correct/incorrect determining program code; and computer readable program code operable to present an incorrect-answer-explanation-screen including an explanation for an incorrect answer and the correct moving image from the moving images presented by said question-screen presenting program code as the choices for the answer when the user-selection is determined as incorrect by said correct/incorrect determining program code.

* * * * *